(12) United States Patent
Wright

(10) Patent No.: US 6,308,957 B1
(45) Date of Patent: Oct. 30, 2001

(54) BRUSH SEAL

(75) Inventor: Christopher Wright, Bristol (GB)

(73) Assignee: Rolls Royce PLC., London (GB)

( * ) Notice: Subject to any disclaimer, the term of this patent is extended or adjusted under 35 U.S.C. 154(b) by 0 days.

(21) Appl. No.: 09/413,525

(22) Filed: Oct. 6, 1999

(30) Foreign Application Priority Data

Oct. 8, 1998 (GB) .................................................. 9821927

(51) Int. Cl.[7] .................................................. F16J 15/447
(52) U.S. Cl. .................................................. 277/355
(58) Field of Search .................................................. 277/355

(56) References Cited

U.S. PATENT DOCUMENTS

| | | | | |
|---|---|---|---|---|
| 885,032 | * | 4/1908 | Ferranti .................................. | 277/355 |
| 5,318,309 | | 6/1994 | Tseng et al. . | |
| 5,688,105 | * | 11/1997 | Hoffelner .............................. | 277/355 |
| 5,884,918 | * | 3/1999 | Basu et al. ............................ | 277/355 |
| 6,032,959 | * | 3/2000 | Carter .................................... | 277/355 |

FOREIGN PATENT DOCUMENTS

| | | |
|---|---|---|
| 2 258 227 A | 3/1993 | (GB) . |
| 2 281 108 A | 2/1995 | (GB) . |

\* cited by examiner

*Primary Examiner*—Anthony Knight
*Assistant Examiner*—Enoch E Peavey
(74) *Attorney, Agent, or Firm*—Oliff & Berridge, PLC

(57) ABSTRACT

A brush seal designed for use between regions of high pressure differential and in an environment in which there is disturbed flow has a bristle pack sub-divided into a plurality of bristle pack regions with a leaky diaphragm between each region. The brush seal may comprise an assembly of individual seals with diaphragms between them or a single bristle pack which is sub-divided by at least one internal diaphragm. The diaphragms are preferably compliant and designed to allow a predetermined leakage flow between bristle regions. The leakage flow has several functions: it causes the pressure differential across the whole seal assembly to be more evenly distributed, and by providing an amount of flow in each pack this acts to calm the bristles thus helping to ensure each bristle region effectively contributes to the seal performance.

13 Claims, 2 Drawing Sheets

BRUSH SEAL

BACKGROUND OF THE INVENTION

The invention concerns the design of an improved brush seal. In particular, the invention relates to a brush seal in which the bristle pack is, effectively, sub-divided into upstream and downstream portions by at least one annular diaphragm.

The basic configuration of a brush seal comprising a simple bristle layer, even with a deep backing plate, does not cope well with high pressure differentials and in regions of disturbed swirling airflow on the high pressure side, for example. A number of factors seem to contribute to poor seal performance in these conditions. On one hand, conditions of high pressure difference causes the bristles to become locked together so that they behave more like a solid mass. When this occurs the bristles are slow to track relative lateral movements of the component against which the seal is produced, for example a rotating shaft, so that once pushed aside by a transient movement the bristles lock-up leaving an increased leakage gap. If the bristles become locked in their undeflected positions initial leakage is low but the tips of the bristles rapidly wear against the co-operating seal surface on the shaft, and the wear rate is increased by shaft excursions, irregularities etc. On the other hand, in disturbed conditions the bristles are caused to flutter with detrimental effect on their co-operative ability to seal effectively because the bristles become permanently splayed destroying their seal properties. Furthermore the deterioration begins with the bristles at the exposed surface and progresses deeper into the layer. Initially the seal appears to perform as expected because the sealing function falls upon bristles further into the layer until eventually all the bristles are corrupted. These two effects may be combined so that while exposed bristles are disturbed and becoming permanently splayed the burden of sealing a high pressure differential falls on bristles towards the back of the layer which are locked together and subject to rapid wear.

Previous attempts to solve these problems, but without long lasting success, have involved assemblies of multiple brush seals. However, it has been found that under dynamic conditions several stages of adjacent brush seals do not contribute equally and a major proportion of the pressure drop across the whole seal assembly is borne by a single stage. Where turbulent conditions prevail the first, upstream seal has a calming influence on the leakage flow and the second or final stage bears most of the pressure drop. The said one stage gives about equal performance to a single stage seal and overall almost nothing is gained in the long term.

SUMMARY OF THE INVENTION

The present invention seeks to provide a multi-stage brush seal having improved performance by forcing a more even distribution of pressure drop across the individual stages simultaneously creating bristle calming conditions.

Therefore, according to the present invention, there is provided a multi-stage brush seal assembly for an annular leakage gap between regions of high pressure differential comprising a plurality of close-coupled bristle pack regions positioned one adjacent another in flow sequence, with partially compliant and leaky diaphragm means located between at least two adjacent bristle pack regions to act as a barrier therebetween and which, in use, provides a controlled low-level flow between the pack regions.

Each of the close-coupled bristle pack regions may comprise, alternatively, the bristle pack of an individual brush seal or a layer of a single, sub-divided bristle pack wherein a leaky diaphragm is interposed between adjacent bristle pack layers. Furthermore the leaky diaphragm means may be realised in one of several ways. For example, the diaphragm means may comprise an annular diaphragm consisting of a multiplicity of diaphragm segments spaced circumferentially around a common support annulus. The segmented diaphragm and support annulus may be formed integrally from a single sheet of flexible material. Alternatively, the leaky diaphragm may comprise a further thin layer of bristles which may be of different size to the bristles of the pack region, the bristles of the thin layer may be disposed at a different angle or even in a different direction relative to the bristles of the pack regions.

BRIEF DESCRIPTION OF THE DRAWINGS

The invention will now be described in greater detail with particular reference to the embodiments illustrated, by way of example only, in the accompanying drawings, in which.

DETAILED DESCRIPTION OF PREFERRED EMBODIMENTS

Figure 1:
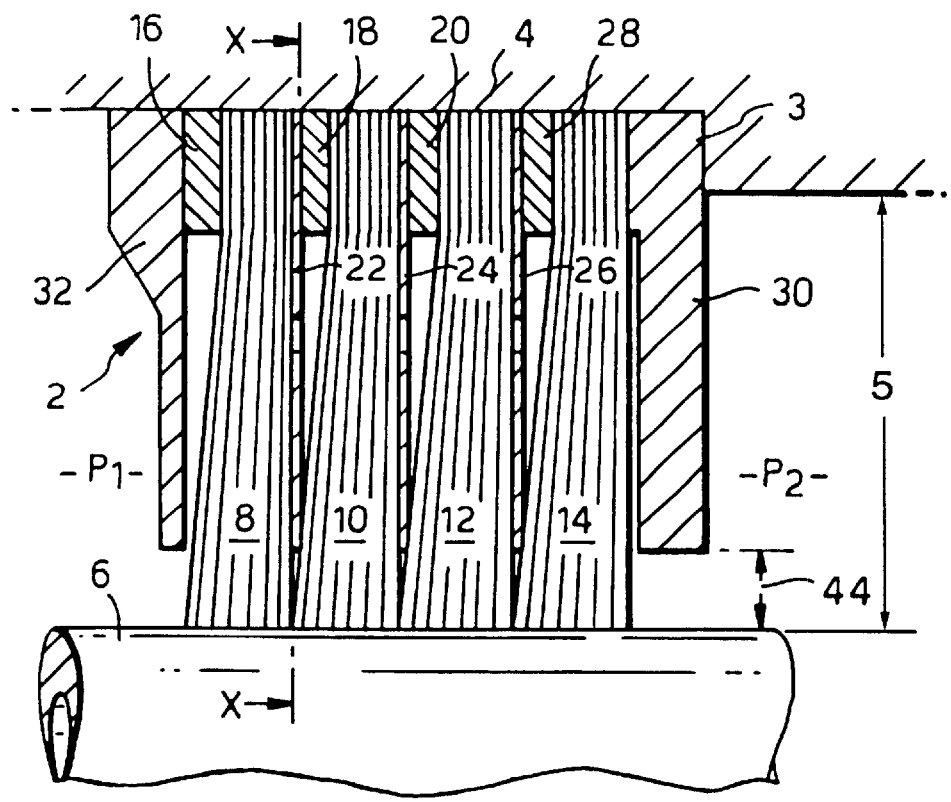
FIG. 1 shows a section through a first embodiment of a brush seal assembly in accordance with the invention comprising a plurality of individual brush seals with a leaky diaphragm between adjacent seals.

Brush seals are generally useful for effecting a seal between a housing and a shaft mounted for rotation with respect to the housing at potentially very high speeds. A typical application is in gas turbine engines where a brush seal may replace a mechanical seal such as a knife edge or labyrinth seal, but they are also found in other applications. The brush seal is useful to provide a controlled leakage seal, that is a partial barrier, in a gap between regions of different pressures. Excessive or uncontrolled gas leakage in a gas turbine engine is undesirable for a number of reasons: for example it reduces engine efficiency through thermodynamic cycle losses, and in an internal air cooling system excessive leakage can result in loss of pressure head to drive the cooling flow.

The design and construction of a typical brush seal, its orientation and manner of fitting are well known in the art and at least a basic knowledge of them will be assumed as background for the purposes this description. The sealing effect is produced by closely packed bristles in a bristle layer co-operating to provide a diffuse leakage path of very low overall leakage rate. Providing the integrity of the bristle layer is maintained its sealing function remains at a high level then brush seal leakage rates are appreciably lower compared to labyrinth seals. This offers significant gains in engine performance due to the reduction of losses in the internal airflow system. The typical seal design has a layer of densely packed fine wire bristles sandwiched between a pair of backing plates. The downstream backing plate extends almost the full radial depth of the bristles and its clearance over the shaft defines the actual leakage gap. Its clearance is large enough to accommodate lateral shaft movements, differential thermal growth, shaft orbiting etc. An upstream plate is not always utilised but may be useful in some instances for calming bristle flutter and blow down.

In practice difficulties arise in maintaining the integrity of a seal under all conditions. Aerodynamic conditions in the immediate vicinity of a seal, in particular high pressure differentials and turbulent flow regimes, have been found to detrimentally affect seal performance. The effect on single layer seal stages is especially marked. Multiple seal cascades often fail to deliver an expected improvement and this has been found to be the result of several factors. On one hand high pressure differentials can cause the bristles to lock together tending to cut-off the inter-bristle diffuse flow so that the bristle pack effectively becomes a solid mass. The inherent resilience of the individual bristles is thereby lost so that during excursions the shaft impacts the bristles which suffer accelerated wear as a result. Also they may be deflected sideways and be unable to return to their sealing position. The bristles may be blown-down into contact with the shaft leading to premature wear. On the other hand turbulent flow in front of the seal bristle layer can also destroy the effectiveness of the seal by causing the bristles to flutter so that they cease to co-operate in providing the diffuse flow path. Both conditions have been observed to occur simultaneously in one seal with bristles at the surface of the pack in a state of flutter while deeper bristles are locked together. Our earlier patent GB 2,281,108B addressed this particular problem by means of a porous cover or shield over the front of the bristle pack to restore benign conditions at the pack face returning a diffuse flow through the bristles and calming their behaviour.

Multiple seal assemblies are seen to suffer the same problems with the additional difficulty that the total pressure drop is not equally shared by all seal stages. Test rig measurements indicate that the most downstream seal stage carries a significantly greater proportion of any given pressure drop and tends to perform in the manner of a single seal stage and is susceptible to the drawbacks discussed above. The present invention attempts to solve these problems in a multiple seal stage arrangement by distributing a pressure differential more evenly between the several stages while ensuring the bristles of each stage remain effective.

Referring now to FIG. 1, there is shown in accordance with the present invention a multi-stage brush seal assembly at 2, located against an annular shoulder 3 in a housing 4 to control flow through an annular leakage gap 5 between the housing and a concentric, relatively rotatable rotor 6. A region of relatively high pressure is represented at $P_1$ to the left and upstream side of the illustration and a region of substantially lower pressure is represented at $P_2$ on the right and downstream side of the illustration. Therefore leakage flow from $P_1$ to $P_2$ through the seal 2 and the gap 5 is from left to right in the drawing in FIG. 1. The same convention is also used in FIG. 2.

The particular brush seal assembly 2 illustrated in FIG. 1 comprises four stages of close-coupled bristle pack regions, indicated at 8,10,12,14 from the left or upstream side. In this embodiment the bristle pack regions are formed as four separate layers each consisting of an individual brush seal, although they may be assembled and packaged as a single unit. The construction of each of the bristle pack regions can be compared to a conventional single stage brush seal, insofar as each has an upstream ring 16, 18, 20, 28, and a downstream backing ring plate 22, 24, 26, 30 with a bristle pack layer sandwiched therebetween. They also follow normal practice in construction in that the bristle pack and the two rings are welded together. Thus, in FIG. 1 the seal assembly includes from the left upstream rings 16,18,20 and 28, and downstream backing plates 22,24,26,30. An upstream protective cover or shield 32, of known configuration, is also disposed abutting the upstream side of ring 16 adjacent the upstream bristle pack 8. The right most downstream backing ring 30 is also of known configuration. Conventionally it is solid and rigid and functions as an air dam in the leakage path.

In accordance with the present invention the intermediate backing plates 22,24,26 interposed between the adjacent upstream and downstream faces of the bristle pack regions 8,10,12,14 comprise partially compliant and leaking diaphragm means, in direct contrast to a conventional backing plate, such as at 30.

The number of bristle pack regions or layers mentioned, i.e. four, is by way of example only and is not intended to be recommended as an optimum number nor as possessing any specially desirable or preferred characteristic.

Figure 2:
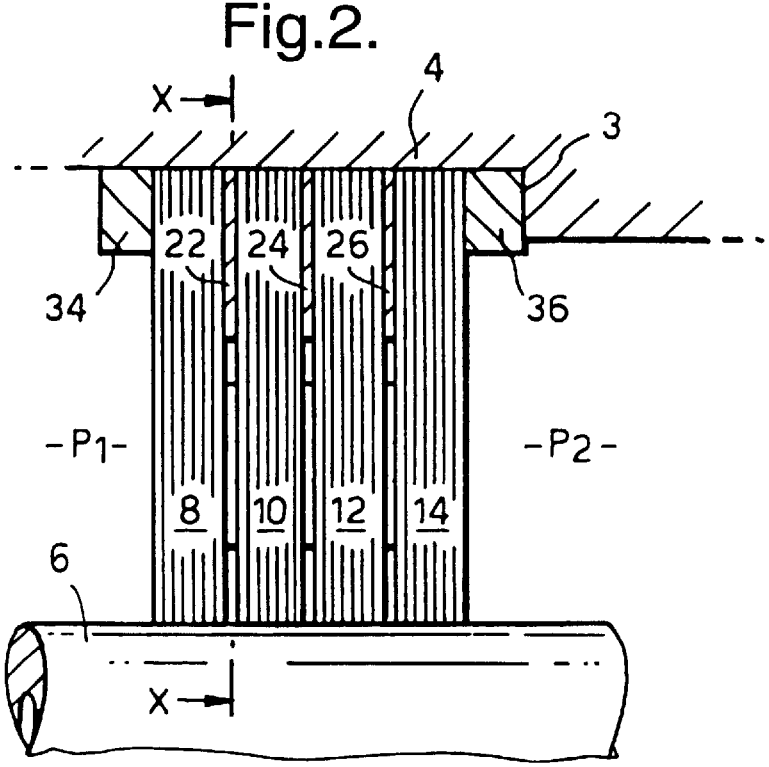
FIG. 2 shows a similar section through a second embodiment comprising a single bristle pack sub-divided by internal leaky diaphragms.

The second embodiment illustrated in FIG. 2 is essentially equivalent to the first embodiment but, whereas the first embodiment comprises an assembly of several individual brush seals, in the second embodiment the several seal stages are formed integrally as a single bristle pack with internal sub-division. With reference to the drawings in order to emphasise correspondence between the constituent parts of the two embodiments like parts are given like reference numerals in FIGS. 1 and 2. Thus, the four annular bristle packs 8,10,12,14 are located one up against another with only the thin backing plates or diaphragms 22,24,26 between them. This composite assembly is sandwiched between rings 34,36 on its upstream and downstream sides respectively. Although these rings 34,36 are shown in the drawing as simple rings of limited radial depth they may be replaced respectively by the front shield 32 and the backing plate 30 of substantially greater depth, as employed in the first embodiment illustrated in FIG. 1.

Figure 3:
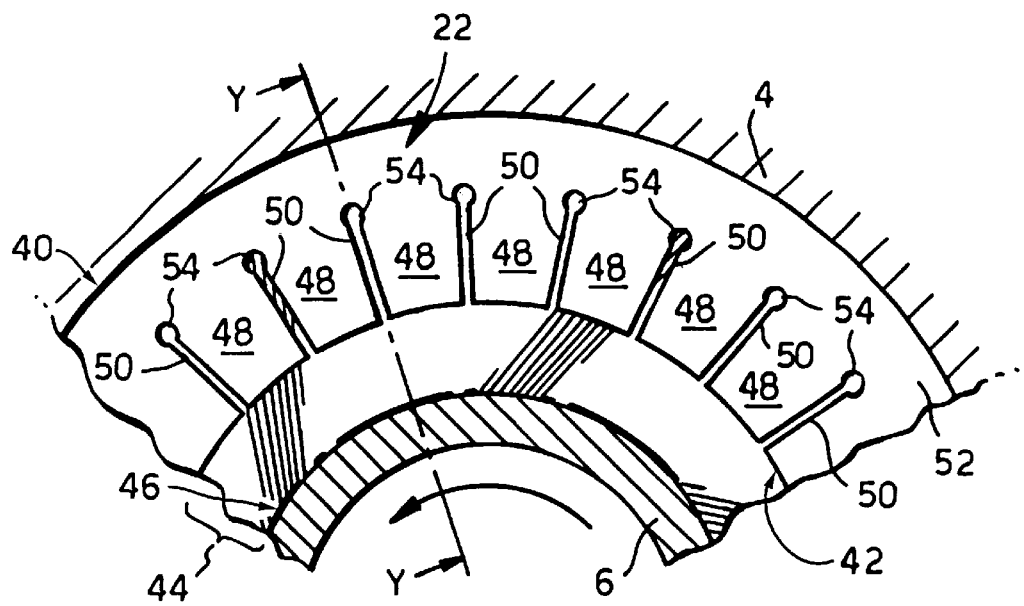
FIG. 3 shows in plan view a portion of the leaky diaphragm used in the embodiments of FIG. 1 and FIG. 2 comprising a segmented plate.

As will now be described the thin backing plates or diaphragms 22,24,26 lying intermediate the bristle packs are formed to be intentionally leaky. That is, the diaphragms do not simply act as air dams but are also pierced at mid-height to provide pressure equalisation and a controlled leakage path. A detail view on the section X—X of FIG. 1 is shown in FIG. 3, this view is common to all the thin backing plates or diaphragms 22,24,26 intermediate the bristle layers in both embodiments. The diaphragm 22, in common with the others, is annular and made of a relatively thin sheet, the material of these sheets may be a metal or metal alloy, such as stainless steel or nickel alloy to withstand the high ambient temperatures encountered. The diameter of the outer annular circumference 40 is equal to the outer circumference of the seal and extends radially inwards for almost the full depth of the bristle layers to an inner annular circumference 42. The dimension of the seal gap 44 between the inner circumference 42 of the annular diaphragm 22 and an outer cylindrical surface 46 of the rotor 6 is chosen according to the same criteria as the corresponding gap between a deep backing plate 30 or a deep front shield 32 and the rotor 6.

The design of the diaphragm 22 is intended to serve two functions which to some extent at least are inter-related. By sub-dividing the overall bristle pack it is intended to alleviate the drawbacks or deficiencies in sealing performance previously noted by introducing measures to distribute the overall pressure drop more evenly between the sub-layers and also to introduce a preferential flow in the bristle pack which will tend to calm disturbed bristles.

A certain amount of compliance in the diaphragms is provided by partial segmentation. The inner circumferential margin of the diaphragm 22, that is an annular region adjacent the inner circumference 42 is divided into a multiplicity of circumferentially extending segments to which the reference 48 is allotted and several of which are visible in the drawing. These segments are formed by a multiplicity of radially extending slots 50, preferably of a "keyhole" shape which extend in radially outward directions from, and are spaced apart around the inner circumference 42. The slots 50 extend radially outwards for a substantial proportion of the radial depth of the bristle layer so that each segment is independently supported by an outer annular region 52 of the diaphragm Each of the slots 50 is terminated by a circular hole 54. The primary function of these holes is to provide a controlled leakage path through the diaphragm into a region of the adjacent bristle pack close to the proximal end of the bristles, but they also function as stress relief features.

Leakage flow through the holes 54 will tend to flow generally in a radial direction along the length of the bristles, towards their free ends, and as has been observed in the prior art such flows have been found to have a calming influence on disturbed bristles. The diameter of the holes 54 is selected to provide a desired leakage rate between bristle layers. The stress relief secondary function operates to prevent crack propagation from the ends of the slots 50 into the remainder of the diaphragm 22.

Also the slightly reduced distance between neighbouring holes 54 tends to encourage a preferential bending zone for each segment. Individual segments are therefore relatively movable, to a limited extent, enabling the diaphragms to be partially compliant and to allow some axial bending of the bristles while tending to damp the movement.

In the drawing of FIG. 3 the bristles in the layer behind the diaphragm 22 are visible in the gap 44 and through the slots 50 and through the leakage holes 54. As indicated in FIGS. 1 and 2 these bristles belong to the bristle pack region 10. As is conventional in the art the bristles are disposed at an angle to the rotor surface 46 usually about 45°. The presence of a multiplicity of radially extending slots in the diaphragm together with the multiplicity of holes determines the rate at which the diaphragm will leak airflow into the downstream bristle layer over a range of depths rather than simply acting as a weir or dam, as would a solid diaphragm. Thus a diffuse air flow is promoted through the layers of the bristle pack in a direction having a radial component. The effect of this flow is to tend to calm disturbed bristles in turbulent conditions and to tend to release bristles which are otherwise locked together. Furthermore, the individual segments of the diaphragm possess a degree of independent compliance, since the region of reduced segment width between neighbouring holes tends to create a preferred region of bending for individual segments. As the diaphragms are disposed in planes perpendicular to the common axis of the brush seal and the shaft, bending takes place in an axial direction so that this movement is available to relieve the pressure induced axial forces acting on the bristles which tend to cause them to lock together. Thus, the compliance of the diaphragm segments in conjunction with the induced radial leakage flow act cooperatively to reduce bristle lock up thereby releasing intermediate portions of the bristle pack to track excursions of the rotor. As a result the sealing properties of the pressure gradient through the seal length is more evenly distributed and overall seal performance is improved.

Figure 4:
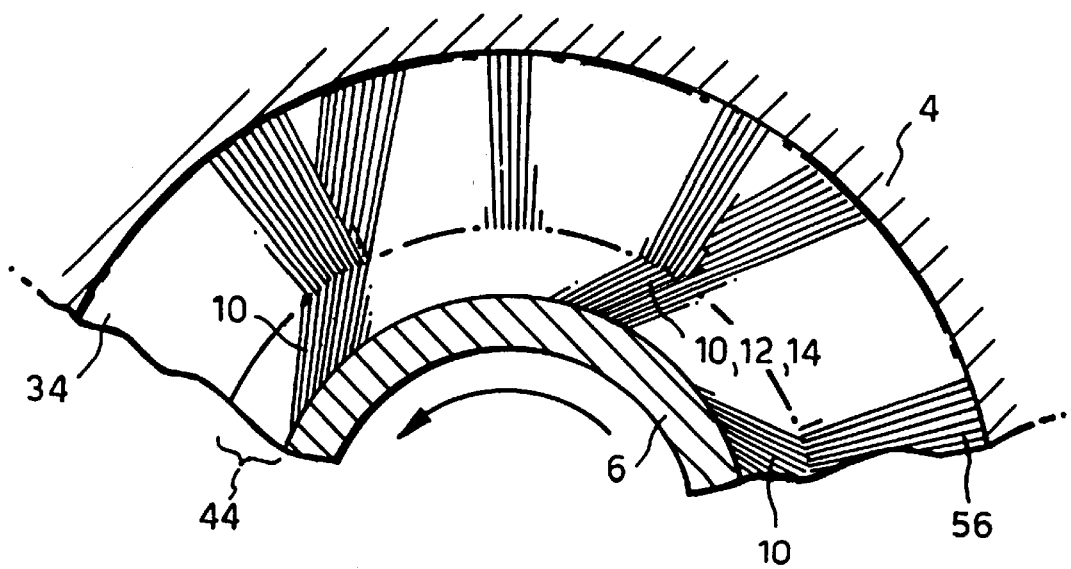
FIG. 4 shows a corresponding view of a further embodiment in which the leaky diaphragm comprises a differentially laid layer of bristles.

Referring now to FIG. 4, there is shown an alternative form of realisation of partially complaint and leaky diaphragm means. For ease of comparison with the embodiment illustrated in FIG. 3 like parts have been given like references. Thus, there is shown housing 4, shaft 6 and bristle pack region 10. The diaphragm means generally indicated at 22 comprises a further annular layer of bristle 56. Preferably the bristles 56 are of a different size, thicker, than the bristles of the adjacent bristle pack regions 8,10; and are disposed at a different lay angle. It has been found advantageous to arrange the bristles 56 in a radial direction with their radially inner tips (in the illustrated example) spaced a short distance from the surface of the rotor, as in the instance of the inner circumference of the diaphragm 52 of FIG. 3.

In one alternative configuration the bristles 56 may be simply laid at a different angle, but sloped in the same direction as the bristles 10. In another configuration the bristles 56 are sloped in the opposite direction to the bristles 10 in the adjacent pack regions. In all cases the bristles 56 lay across the bristles of the adjacent regions and are thus able to support the bristles and resist axial movement. However, like all bristle regions a certain level of diffuse flow passes through the bristle pack, thus passing from the downstream face of the upstream bristle pack, through the diaphragm layer, and into the upstream face of the downstream bristle pack. The resulting effect on bristle behaviour is therefore substantially the same as that achieved with the diaphragm means 52 of the FIG. 3 embodiment.

What is claimed is:

1. A multi-stage brush seal assembly for an annular leakage gap between regions of high pressure differential, comprising:

a plurality of close-coupled bristle pack regions positioned one adjacent another in flow sequence; and partially compliant and leaky diaphragm means located between at least two adjacent bristle pack regions to act as a barrier therebetween and which, in use, provides a controlled low-level flow between the pack regions, wherein an upstream face of at least one leaky diaphragm means contacts a downstream face of an upstream bristle pack.

2. A multi-stage brush seal assembly as claimed in claim 1, wherein each close-coupled bristle pack region comprises an individual brush seal located so the upstream face of a downstream seal lies adjacent the downstream face of an upstream seal, a partially compliant and leaky diaphragm means interposed between confronting upstream and downstream faces of adjacent brush seals.

3. A multi-stage brush seal assembly as claimed in claim 2, wherein an upstream face shield is located adjacent the upstream face of the upstream seal and a downstream backing plate is located adjacent the downstream face of the downstream seal, and when there are at least three brush seals, brush seals between the upstream seal and the downstream seal are intermediate brush seals, and faces of the intermediate brush seals have neither backing plate nor face plate.

4. A multi-stage brush seal assembly as claimed in claim 1, wherein the plurality of close-coupled bristle pack regions comprises a single bristle pack internally sub-divided by at least one partially compliant and leaky diaphragm means.

5. A multi-stage brush seal as claimed in claim 4, wherein each slot is terminated by a small hole of diameter slightly greater than the width of a slot, and the diameter of the hole is selected according to a required leakage flow.

6. A multi-stage brush seal as claimed in claim 1, wherein each leaky diaphragm means comprises an annulus of relatively stiff material compared to the stiffness of the pack bristles.

7. A multi-stage brush seal assembly as claimed in claim 6, wherein the each leaky diaphragm means comprises an annular plate of stiff material formed with a multiplicity of slots extending from one annulus circumference in a generally radial direction, said slots being spaced apart around the circumference whereby to form a multiplicity of independently movable segments.

8. A multi-stage brush seal as claimed in claim 7, wherein the slots extend for a substantial part of a radial depth of the diaphragm.

9. A multi-stage brush seal as claimed in claim 7, wherein the slots are of narrow width sufficient only to permit relative movement of adjacent segments.

10. A multi-stage brush seal assembly as claimed in claim 6, wherein the each leaky diaphragm means comprises a further annular layer of bristles.

11. A multi-stage brush seal assembly as claimed in claim 10, wherein the further layer of bristles comprises wires of a different size compared to the wires of an adjacent bristle pack region.

12. A multi-stage brush seal assembly as claimed in claim 10, wherein the bristles of the further layer are disposed at a different lay angle compared to the lay angle of the bristles of an adjacent bristle pack region.

13. A multi-stage brush seal assembly as claimed in claim 10, wherein the bristles of the further layer are disposed in a different direction compared to the bristles of an adjacent bristle pack region.

* * * * *